United States Patent Office 3,190,853
Patented June 22, 1965

3,190,853
POLYESTERS OF 2,8-DIBENZOFURANDICAR-
BOXYLIC ACID
William H. Watson, Grifton, N.C., assignor to E. I. du
Pont de Nemours and Company, Wilmington, Del., a
corporation of Delaware
No Drawing. Filed Dec. 20, 1961, Ser. No. 160,955
15 Claims. (Cl. 260—47)

This invention relates to a novel class of moldable linear polyesters, as well as to fibers, films, and other shaped articles produced therefrom, and is more particularly concerned with such products characterized by the presence of recurring units of esterified 2,8-dibenzofurandicarboxylic acid

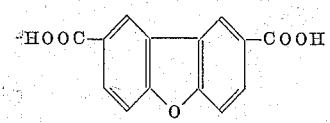

In accordance with this invention polyesters are prepared by reacting dihydroxy compounds containing from 2 to 20 carbon atoms, or ester-forming derivatives thereof, with 2,8-dibenzofurandicarboxylic acid, or ester-forming derivatives thereof, which are useful in the preparation of tenacious fibers and films. Many of these novel polyester fibers are characterized by highly superior performance in "wash-and-wear" garments.

The novel linear polyesters of the invention may be illustrated as possessing recurring units of the following structural formula:

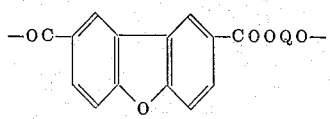

in which Q is a divalent organic radical containing from 2 to 20 carbon atoms. Thus, Q may be an arylene, aralkylene, or alkylene (including cycloalkylene) radical of 2 to 20 carbon atoms derived from a bisphenol or a glycol of the formula $Q(OH)_2$. Ester-forming derivatives of the dihydroxy compound, i.e., compounds containing functional groups equivalent to the hydroxyl group in their ability to react with the carboxyl group, such as epoxides or esters of the dihydroxy compound, may also be used. Particularly useful are the acetate ester or esters of other aliphatic acids having relatively few carbon atoms. Suitable dihydroxy compounds include ethylene glycol, propylene glycol, butylene glycol, 2,2-dimethylpropylene glycol, 2,2,3,3,4,4-hexafluoro-1,5-pentanediol, hexamethylene glycol, decamethylene glycol, diethylene glycol, ethylene thiodiglycol, cis- or trans-hexahydro-p-xylylene glycol, cis- or trans-quinitol, 1,1-bis(hydroxymethyl)cyclohexane, 2,2 - bis(4 - hydroxycyclohexyl)propane, hydroquinone, resorcinol, 4,4'-dihydroxyphenyl, 3,3' - dibromo - 4,4' - dihydroxybiphenyl, bis - (4 - hydroxylphenyl)methane, 2,2 - bis - (4 - hydroxyphenyl)-propane, 2,2-bis-(3,5-dichloro-4-hydroxyphenyl)propane, 1,4-bis-(2-hydroxyethoxy)benzene, bis-(4-hydroxyphenyl)ether, bis-(4-hydroxyphenyl)sulfone, bis-(4-hydroxyphenyl)ketone, bis-(4-hydroxyphenyl)sulfoxide, and 1,4-bis-(2-hydroxyethyl)benzene. The divalent Q radical is preferably composed primarily of carbon and hydrogen but may contain other atoms such as halogen atoms. Q may also be a chalkogen-containing radical wherein each chalkogen atom is bonded to carbon or a different chalkogen atom, and no carbon is bonded to more than one chalkogen atom. Thus, the repeating units may contain ether, carbonyl, sulfide, sulfoxide, or sulfonyl radicals. Mixtures of the dihydroxy compounds may be employed.

Polyesters prepared in accordance with the present invention are readily adaptable for the manufacture of shaped articles such as fibers and films. The presence of the 2,8-dibenzofurandicarboxylate residue in the repeating structural units of the polyester appears to be particularly beneficial for end use of the polymer to form fibers in garments which are relatively free from wrinkling after laundering, so that little or no ironing of the garments is required. Fabrics adaptable for making garments of this type, requiring only minimum care, are frequently characterized as "wash-and-wear" fabrics. 2,8-dibenzofurandicarboxylic acid contains a stiff ring structure, and when the acid is converted to a polyester the chain-extending valence bonds emanating from the ring structure are held at an angle to one another. It appears that the size of the 2,8-dibenzofurandicarboxylate unit, the stiffness of the ring system, and the angle formed by the chain-extending valence bonds cooperate uniquely to promote a balance of polymer chain stiffness and polymer chain resilience resulting in a high degree of recovery from tensile stress applied to the polymer molecule, although this statement is not intended to be limiting.

The polyesters of the invention are prepared by reacting a dihydroxy compound or an ester-forming derivative thereof, as described above, with 2,8-dibenzofurandicarboxylic acid or an ester-forming derivative of the acid. By an ester-forming derivative of the acid is meant a derivative of 2,8-dibenzofurandicarboxylic acid containing functional groups equivalent to the carboxylic acid groups in their ability to react with hydroxyl groups. Such ester-forming derivatives include its esters, particularly its esters with the lower aliphatic alcohols, with phenol, or with the glycol from which the polyester is to be formed, as well as the carbonyl halides, anhydrides, and salts of the acid.

A convenient method involves the use of an alkyl or aryl ester of 2,8-dibenzofurandicarboxylic acid with an excess of the glycol from which the polyester is to be formed in an ester interchange reaction. In carrying out the ester interchange reaction, at least one molecular proportion of the glycol per molecular proportion of the 2,8-dibenzofurandicarboxylate ester should be used, greater proportions being preferred. It is desirable to employ an ester of the 2,8-dibenzofurandicarboxylic acid formed from an alcohol or phenol with a boiling point considerably below that of the glycol to be used so that the former can be easily removed from the reaction zone by distillation. It is preferred to use the methyl or ethyl esters, as these esters are formed from alcohols which, because of their relatively low boiling points, are easily separated by distillation from the glycol to be used to form the desired polyester. Heating should be above the melting point of the reaction mixture and above the boiling point of the alcohol or phenol to be displaced, but not substantially above the boiling point of the glycol, although temperatures as high a s 25° C. above the boiling point of the glycol may be used to hasten completion of the reaction. Heating should be effected under conditions such that the displaced alcohol or phenol can be removed from the reaction zone, usually by means of conventional distillation equipment. The heating is usually at atmosphereic pressure, but higher or lower pressures may be used if desired. The ester interchange reaction is advantageously carried out in the presence of ester interchange catalysts such as manganous acetate, calcium acetate, litharge, sodium methoxide, sodium hydrogen hexabutoxytitanate, or other suitable ester interchange catalysts as described in the literature relating to preparation of polyesters.

Following the ester interchange reaction, heating is continued under reduced pressure until the excess of the dihydroxy compound is removed and the polymerization reaction has proceeded to the desired degree. The final stages of polymerization may be carried out with the polymer in the molten state, or if desired, the reaction may be completed by solid phase polymerization. The polymerization reaction may be carried out in the presence of catalysts such as antimony trioxide, tetraisopropyl titanate, litharge, zinc acetate, or other suitable polycondensation catalysts as described in the literature.

As used herein, the term "polyester" is intended to include not only homopolyesters but also copolyesters, terpolyesters, and the like.

While the preferred embodiment of the invention comprises polyesters in which all, or substantially all (i.e., greater than 90%), of the recurring structural units consist of 2,8-dibenzofurandicarboxylate esters of dihydroxy compounds, it is to be understood that the invention also comprises polyesters in which other acid residues are present. In general, for the 2,8-dibenzofurandicarboxylate radical to contribute significantly to the properties of the polyester, it is preferred that at least about 10 mol percent of the acid component of the polyester is 2,8-dibenzofurandicarboxylic acid. By "acid component" of the polyester is meant the sum of all the carboxylic acids which would be formed by hydrolysis of the carbonyloxy linkages in the polymer chain. The remainder of the acid component of the polyester, up to about 90 mol percent, may be any suitable dicarboxylic acid or hydroxycarboxylic acid. Examples of such compounds include terephthalic acid, isophthalic acid, 5-chloroisophthalic acid, 5-bromoisophthalic acid, 2,6-naphthalenedicarboxylic acid, m-terphenyl-4,4''-dicarboxylic acid, 4,4'-sulfonyldibenzoic acid, 4,4'-bibenzoic acid, 4,4'-benzophenonedicarboxylic acid, 1,2,-bis(4-carboxyphenyl)ethane, bis-4-carboxyphenyl ether, 4-(2-hydroxyethyl)benzoic acid, 4-(2-hydroxyethoxy)benzoic acid, adipic acid, hexahydroterephthalic acid, and sebacic acid. A preferred compound for use as the other acid component is 4,4'-bibenzoic acid in amounts ranging from 10 to 90 mol percent of the acid component. Hydrocarbon dicarboxylic acids or hydroxycarboxylic acids are normally preferred as copolymeric acids; however, halogen or chalkogen modifiers may also be present, as described above with respect to the dihydroxy compound. A minor amount of a dihydroxy compound or an acid component carrying a metallic sulfonate salt, carboxylate salt, phosphonate salt, or the like may also be present.

In its broadest scope, the invention therefore comprehends highly polymeric linear carbonyloxy polyesters of bifunctional compounds containing two functional groups selected from the class consisting of (a) hydroxyl groups and (b) carboxylic acid groups, said bifunctional compounds consisting of (A) an acid component containing at least about 10 mol percent of 2,8-dibenzofurandicarboxylic acid and (B) a dihydroxy component containing from 2 to 20 carbon atoms. Within the broad range of useful polymers, which includes polyesters melting as low as about 100° C. and as high as about 325° C., it is generally considered that those polyesters melting below about 200° C. are suitable for molding compositions while the higher melting polyesters have a similar utility but are also especially advantageous for the extrusion of fibers and films. Polyesters having an intrinsic viscosity of at least about 0.2 are considered to be of sufficiently high molecular weight for utility in forming molded articles as well as films. For use in extruding fibers and filaments, polycondensation is usually continued until the intrinsic viscosity is at least about 0.3.

The following examples will serve to describe the preparation of 2,8-dibenzofurandicarboxylic acid, as well as typical polyesters and copolyesters derived therefrom. The examples are not intended to be limitative.

EXAMPLE 1

*Preparation of dimethyl 2,8-dibenzofurandicarboxylate*

A solution of 168 g. of dibenzofuran and 196 g. of acetyl chloride in 1200 ml. of methylene chloride is cooled to −20° C. The temperature is maintained below −10° C. while 280 g. of powdered aluminum chloride is added in small portions, with rapid stirring. A thick yellow mixture is formed which is allowed to warm to room temperature. The mixture is stirred for 24 hours, after which it is poured over crushed ice to hydrolyze the aluminum chloride complex. After the ice melts, the methylene chloride solution is separated, washed once with dilute hydrochloric acid (50 ml./l.), and once with distilled water. The solvent is removed by evaporation on a steam bath, resulting in 245 g. (97% yield) of the product, 2,8-diacetodibenzofuran, M.P. 148–153° C. Two recrystallizations from ethanol, with charcoal treatment, and a final recrystallization from xylene raise the M.P. to 162–3° C. The diketone is analyzed for carbon and hydrogen and found to consist of 75.9% carbon and 4.8% hydrogen, compared with calculated values of 76.1% carbon and 4.8% hydrogen.

A potassium hypochlorite solution is prepared from 450 g. of calcium hypochlorite, 315 g. of potassium carbonate, 90 g. of potassium hydroxide, and 3100 ml. of water in accordance with the directions of Org. Syn. Coll., vol. II, p. 429. The hypochlorite solution is heated to 65° C. and 112 g. of 2,8-diacetodibenzofuran in 300 ml. of dioxane is added, in portions, over a period of one hour while the temperature is maintained between 63 and 70° C. After the last of the solution is added, the temperature is allowed to rise to 76° C., and cooling is then initiated with stirring for one hour during which the temperature gradually falls to 55° C. Excess potassium hypochlorite is destroyed by cautious addition of acetone. Excess dilute hydrochloric acid is then added to precipitate the product, which is then filtered off, redissolved in base, acidified, collected, and sucked dry. The product, 2,8-dibenzofurandicarboxylic acid, is washed 3 times by stirring it in boiling distilled water, filtering and drying the product each time. The yield is 108 g., 95% of theoretical.

The acid is refluxed for 16 hours with excess thionyl chloride (10 ml./g.), using pyridine as a catalyst. The excess thionyl chloride is then distilled from the reaction mixture, after which the resulting solid product is recrystallized twice from toluene. A 58% yield of purified product, 2,8-dibenzofurandicarbonyl chloride, M.P. 232° C. is obtained.

The preparation of the acid chloride is repeated, except that after the excess thionyl chloride is distilled from the reaction mixture, excess anhydrous methanol is added cautiously to the solid acid chloride. The mixture is refluxed several hours, cooled, and the product collected. The product is washed with cold methanol containing sufficient sodium methoxide to neutralize the acidity present, after which the product is recrystallized twice from dioxane, using activated charcoal in the first recrystallization. A 57% yield is obtained of the purified product, dimethyl 2,8-dibenzofurandicarboxylate, M.P. 164–167° C., S.E. 140 (calculated S.E. 142). Analysis of the ester for carbon and hydrogen give results of 67.3% carbon and 4.21% hydrogen, compared with calculated values of 67.6% carbon, 4.26% hydrogen. Two additional crystallizations of the dimethyl ester from toluene raise the melting point of the ester to 168–169° C.

EXAMPLE 2

*Fiber-forming polyester with hexahydro-p-xylylene glycol and fibers prepared from the polyester*

A mixture of 12.5 g. of dimethyl 2,8-dibenzofurandicarboxylate, 19 g. of trans-hexahydro-p-xylylene glycol, and 0.138 g. of NaHTi(OBu)₆ in 2 ml. of n-butanol is heated at atmospheric pressure at 170° to 240° C. while removing methanol by distillation. The pressure is then reduced to 0.6 mm. and the temperature is increased to 298° C. The product obtained after polycondensation for three hours, poly(trans-hexahydro-p-xylylene 2,8-dibenzofurandicarboxylate), has an intrinsic viscosity of 0.53 and a crystalline melting point of 278° C. (temperature at which the last trace of birefringence disappears when the polymer sample is heated slowly on the hot stage of a microscope between crossed Nicol prisms).

A sample of the molten polymer is spun into filaments, using conventional techniques. The filaments are oriented by drawing them around a pin maintained at 172° C., using a draw ratio of 3.8×. The drawn yarn has a tenacity of 2.2 g.p.d., a break elongation of 21.5%, and a modulus of 39 g.p.d. The fiber is found to have excellent ability to recover from low levels of extension. Values for "tensile strain recovery" (TSR) and "modified tensile strain recovery" (MTSR) are 77% and 81%, respectively.

The TSR of a yarn sample is determined by mounting a 10-inch length of the yarn on a tensile tester (commercially available from the Instron Engineering Corporation, Quincy, Mass.). The sample is then immersed in a water bath maintained at 40° C. for a period of 2 minutes and then stretched, in the water bath, at an elongation rate of 1 inch per minute. Upon reaching the desired total elongation, the sample is held at constant length for an additional 2 minutes and the water bath is removed. The load on the yarn is then reduced to a value of 0.042 g.p.d. and the yarn is allowed to retract. Percent recovery is calculated from the formula:

$$\frac{\text{units of retraction}}{\text{units of elongation}} \times 100$$

This procedure is carried out for elongations of 0.5, 1, 2, and 3%, and a graph is prepared by plotting the percent recovery against total elongation in the range 0–3%. TSR values are average percent recovery values from the range 0–3% elongation which may be determined from the graph by usual graphical averaging procedures.

Yarns having TRS values of 60% are considered to have good tensile recovery, while yarns exhibiting TSR values of 70% and above are considered quite superior.

The MTSR of a yarn sample is determined by repeating the procedure described above for TSR determination, except that (1) the yarn is initially dried on the tensile tester in a slack condition for 4 minutes at 80° C. and then cooled for one minute before being immersed in the water bath and stretched and (2) after the yarn has been stretched and the water bath removed, the load on the yarn is reduced to a value of 0.042 g.p.d. and the yarn is allowed to retract while again being dried at a temperature of 80° C. for 4 minutes; the heater is then removed and the yarn cooled for an additional 1 minute before the final length is measured. Calculation of the MTSR value is then carried out using the same formula and graphical procedures employed for TSR as described above. In rating yarns for tensile recovery using the MTSR parameter, a value of 70% is considered good and a value of 80% is considered superior.

The term "intrinsic viscosity," as used herein, is defined as the limit of the fraction $$\frac{\ln(r)}{c}$$

as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts of methylene chloride (by volume) to the viscosity of the trifluoroacetic acid/methylene chloride mixture, per se, measured in the same units at 25° C. Intrinsic viscosity is a measure of the degree of polymerization.

EXAMPLE 3

*Poly[2,2-bis(4-phenylene)propane 2,8-dibenzofurandicarboxylate]*

In a 3-neck flask equipped with a stirrer, nitrogen inlet, and reflux condenser is placed 0.1 ml. of molten 2,2-bis (4-hydroxyphenyl)propane, 0.1 ml. of molten 2,8-dibenzofurandicarbonyl chloride, and 400 ml. of dry o-dichlorobenzene. The solution is refluxed for 48 hours while maintaining a sweep of nitrogen at 0.3 liter per minute. The solution is then poured into heptane and the precipitated polymer is collected. After vacuum drying the polymer is found to have an intrinsic viscosity of 0.24 and a polymer melting temperature of 270° C. "Polymer melting temperature" is the gross melting temperature determined by heating a polymer sample slowly and observing the lowest temperature at which a slight pressure causes permanent deformation of the sample.

EXAMPLE 4

*Poly(ethylene 2,8-dibenzofurandicarboxylate)*

0.1 mol of dimethyl 2,8-dibenzofurandicarboxylate is mixed with 0.22 mol of ethylene glycol and a catalytic amount of $Mn(OAc)_2 \cdot 4H_2O$ and $Sb_2O_3$ is added. The mixture is heated at atmospheric pressure until no more methanol is distilled out, after which the temperature is gradually raised to 260° C. while the pressure is reduced to about 1 mm. and held there for about 3 hours while glycol is removed. The product, poly(ethylene 2,8-dibenzofurandicarboxylate), has an intrinsic viscosity of 0.3 and a polymer melting temperature of 180–195° C. Fibers pulled from the melt are drawable at 80° C.

EXAMPLE 5

*Modification to introduce dye receptive groups*

Example 4 is repeated, substituting in place of 0.1 mol of dimethyl 2,8-dibenzofurandicarboxylate a mixture of 0.004 mol of sodium 3.5-dicarbomethoxybenzenesulfonate and 0.096 mol of dimethyl 2,8-dibenzofurandicarboxylate. Fibers spun from the resulting polymer exhibit greatly enhanced dyeability with Fuchsine SBP dye (C.I. 42,510) and other basic dyes as compared with the homopolyester of Example 4.

EXAMPLE 6

*Copolyester of improved dyeability*

Example 4 is again repeated, substituting in place of 0.1 mol of dimethyl 2,8-dibenzofurandicarboxylate a mixture of 0.015 mol of dimethyl dodecahydro-2,8-dibenzofurandicarboxylate and 0.085 mol of dimethyl 2,8-dibenzofurandicarboxylate. Fibers spun from the resulting polymer exhibit enhanced dyeability with 1,4-diamino-2,3-dichloroanthraquinone and other disperse dyes as compared with the homopolyester of Example 4.

EXAMPLE 7

*Copolyester films*

In a series of experiments, Example 4 is repeated, substituting in place of 0.1 mol of dimethyl 2,8-dibenzofurandicarboxylate the following mixtures:

(a) 0.09 mol dimethyl 2,8-dibenzofurandicarboxylate
    0.01 mol dimethyl isophthalate (b) 0.09 mol dimethyl 2,8-dibenzofurandicarboxylate
    0.01 mol dimethyl sebacate (c) 0.075 mol dimethyl 2,8-dibenzofurandicarboxylate
    0.025 mol dimethyl terephthalate (d) 0.04 mol dimethyl 2,8-dibenzofurandicarboxylate
    0.06 mol dimethyl 4,4'-bibenzoate (e) 0.015 mol dimethyl 2,8-dibenzofurandicarboxylate
    0.08 mol dimethyl 4,4'-bibenzoate (f) 0.01 mol dimethyl 2,8-dibenzofurandicarboxylate
0.09 mol dimethyl 4,4'-bibenzoate Polymerization temperatures of 325° C. are employed in the latter three experiments. The copolyester products are melt-pressed into tough, flexible films.

Since many different embodiments of the invention may be made without departing from the spirit and scope thereof, it is to be understood that the invention is not limited by the specific illustrations except to the extent defined in the following claims.

I claim:
1. A moldable linear polyester characterized by the presence of recurring ester units of 2,8-dibenzofurandicarboxylic acid and a dihydroxy compound of 2 to 20 carbon atoms having the hydroxyl group directly attached to a divalent organic radical selected from the group consisting of arylene, aralkylene and alkylene.
2. The moldable linear 2,8-dibenzofurandicarboxylate ester of a bisphenol of 2 to 20 carbon atoms.
3. The moldable linear 2,8-dibenzofurandicarboxylate ester of a glycol of 2 to 20 carbon atoms.
4. The moldable linear copolyester of 2,8-dibenzofurandicarboxylic acid, 4,4'-bibenzoic acid and alkylene glycol of 2 to 20 carbon atoms.
5. The moldable linear copolyester of 2,8-dibenzofurandicarboxylic acid, isophthalic acid and alkylene glycol of 2 to 20 carbon atoms.
6. The moldable linear copolyester of 2,8-dibenzofurandicarboxylic acid, terephthalic acid and alkylene glycol of 2 to 20 carbon atoms.
7. The moldable linear copolyester of 2,8-dibenzofurandicarboxylic acid, sebacic acid and alkylene glycol of 2 to 20 carbon atoms.
8. The moldable linear copolyester of 2,8-dibenzofurandicarboxylic acid, dodecahydro-2,8-dibenzofurandicarboxylic acid and alkylene glycol of 2 to 20 carbon atoms.
9. The moldable linear copolyester of 2,8-dibenzofurandicarboxylic acid, 3,5-dicarbomethoxybenzenesulfonate and alkylene glycol of 2 to 20 carbon atoms.
10. Poly(ethylene 2,8-dibenzofurandicarboxylate).
11. Poly[2,2 - bis(4-phenylene)propane 2,8 - dibenzofurandicarboxylate].
12. Poly(trans-hexahydro-p-xylylene 2,8-dibenzofurandicarboxylate).
13. Linear polyester fibers of poly(transhexahydro-p-xylylene 2,8-dibenzofurandicarboxylate).
14. Linear polyester fibers of poly(ethylene 2,8-dibenzofurandicarboxylate).
15. Linear polyester fibers consisting of at least 90% poly(ethylene 2,8-dibenzofurandicarboxylate).

References Cited by the Examiner
UNITED STATES PATENTS
2,848,486   8/58   Petropoulos _____ 260—75

OTHER REFERENCES
Gilman et al.: J. Amer. Chem. Soc., vol. 61 (1939), pages 2836–45.

LEON J. BERCOVITZ, Primary Examiner.

N. B. TORCHIN, Examiner.